United States Patent
Fujii

(10) Patent No.: US 12,466,276 B2
(45) Date of Patent: Nov. 11, 2025

(54) FUEL CELL ELECTRIC VEHICLE

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 813 days.

(21) Appl. No.: 17/808,208

(22) Filed: Jun. 22, 2022

(65) Prior Publication Data

US 2023/0065571 A1    Mar. 2, 2023

(30) Foreign Application Priority Data

Aug. 25, 2021 (JP) .................................. 2021-137082

(51) Int. Cl.
  *B60K 15/03* (2006.01)
  *B60K 15/063* (2006.01)
  *B60L 50/72* (2019.01)
  *H01M 8/04082* (2016.01)

(52) U.S. Cl.
  CPC ........ *B60L 50/72* (2019.02); *B60K 15/03006* (2013.01); *B60K 15/063* (2013.01); *H01M 8/04201* (2013.01); *B60K 2015/03315* (2013.01); *B60K 2015/0634* (2013.01); *H01M 2250/20* (2013.01)

(58) Field of Classification Search
  CPC .................................................. B60K 15/07
  See application file for complete search history.

(56) References Cited

U.S. PATENT DOCUMENTS

| | | | |
|---|---|---|---|
| 7,303,211 B2 * | 12/2007 | Borroni-Bird | ........... B60K 1/04 280/783 |
| 8,056,928 B2 * | 11/2011 | Ijaz | ...................... B60K 15/013 280/830 |
| 10,780,777 B2 * | 9/2020 | Sawada | ................ B60K 15/067 |
| 2006/0061081 A1 | 3/2006 | Kresse et al. | |
| 2017/0240039 A1 * | 8/2017 | Okawachi | ............. B60K 15/07 |
| 2017/0282709 A1 * | 10/2017 | Sasaki | ............. B60K 15/03006 |

(Continued)

FOREIGN PATENT DOCUMENTS

| | | | | |
|---|---|---|---|---|
| JP | 2005075224 A | | 3/2005 | |
| JP | 3813530 B2 | * | 8/2006 | ............. B60K 15/07 |
| JP | 5276356 B2 | | 5/2013 | |

(Continued)

*Primary Examiner* — Valentin Neacsu
*Assistant Examiner* — Hosam Shabara
(74) *Attorney, Agent, or Firm* — Hunton Andrews Kurth LLP

(57) ABSTRACT

A fuel cell electric vehicle includes a ladder frame, a fuel cell stack, a fuel tank, a joint, and a center tunnel. The ladder frame includes two side members extending in parallel in a front-rear direction of the fuel cell electric vehicle and a plurality of cross members linking the two side members. The fuel tank stores fuel gas to be used by the fuel cell stack. The fuel cell stack and the fuel tank are fixed to the ladder frame. The fuel tank and the joint are linked by a first fuel pipe made of metal, and the joint and the fuel cell stack are linked by a second fuel pipe. The fuel tank and the joint are supported by the ladder frame and accordingly the relative vibration of the joint with respect to the fuel tank is reduced, and are disposed in the center tunnel.

7 Claims, 5 Drawing Sheets

(56) References Cited

U.S. PATENT DOCUMENTS

2020/0369323 A1 11/2020 Nakamura et al.
2021/0388948 A1 12/2021 Fujii

FOREIGN PATENT DOCUMENTS

| JP | 2014151805 A | 8/2014 |
|---|---|---|
| JP | 2017185843 A | 10/2017 |
| JP | 2020189578 A | 11/2020 |
| JP | 2021195964 A | 12/2021 |
| KR | 20170113345 A | 10/2017 |

\* cited by examiner

FUEL CELL ELECTRIC VEHICLE

CROSS-REFERENCE TO RELATED APPLICATION

This application claims priority to Japanese Patent Application No. 2021-137082 filed on Aug. 25, 2021, incorporated herein by reference in its entirety.

BACKGROUND

1. Technical Field

The technology disclosed in the present specification relates to a fuel cell electric vehicle provided with a ladder frame and a fuel tank.

2. Description of Related Art

In a fuel cell electric vehicle disclosed in Japanese Unexamined Patent Application Publication No. 2017-185843 (JP 2017-185843 A), a fuel tank is disposed in a center tunnel, effectively using space in the center tunnel. The fuel tank is fixed to a floor panel.

SUMMARY

In ladder frame type automobiles, a body including a floor panel is disposed on a ladder frame. The body is supported by the ladder frame through vibration isolating mounts. When traveling, the ladder frame vibrates relative to the body. A fuel cell stack and a fuel tank are assumed to be supported by (fixed to) the ladder frame. The fuel tank and the fuel cell stack are connected by a fuel pipe. High-pressure fuel gas (hydrogen gas) is stored in the fuel tank. At least two fuel pipes that carry the high-pressure fuel gas are linked from the fuel tank to the fuel cell stack, by joints. Fuel pipes made of metal are employed, since a high level of pressure withstanding performance is required for fuel pipes through which the high-pressure fuel gas in the fuel tank passes (fuel pipes through which the fuel gas in the fuel tank passes without being depressurized). When the joints are supported by the body (floor panel), the joints will vibrate relative to the fuel tank while traveling. The relative vibration of the joins to the fuel tank repeatedly deforms the fuel pipes that are made of metal and that link the fuel tank and the joints. When the fuel pipes are repeatedly deformed, metal fatigue of the fuel pipes advances.

The disclosure provides technology for suppressing fatigue degradation (fatigue degradation due to vibration) of a fuel pipe that is made of metal and that links a fuel tank and a joint.

An aspect of the disclosure relates to a fuel cell electric vehicle including a ladder frame, a fuel cell stack, a fuel tank, a joint, a first fuel pipe, a second fuel pipe, and a center tunnel. The ladder frame includes two side members extending in parallel in a front-rear direction of the fuel cell electric vehicle and a plurality of cross members linking the two side members. The fuel cell stack is supported by the ladder frame. The fuel tank is configured to store fuel gas to be used by the fuel cell stack. The joint is configured to link a pipe for carrying the fuel gas that is under high pressure in the fuel tank. The first fuel pipe is made of metal and is configured to link the fuel tank and the joint. The second fuel pipe is configured to link the joint and the fuel cell stack. The center tunnel is provided in a floor panel. The fuel tank and the joint are supported by the ladder frame and disposed in the center tunnel.

In the fuel cell electric vehicle according to the above aspect, the fuel cell stack, the fuel tank, and the joint are supported by the ladder frame. Thus, according to the fuel cell electric vehicle of the above aspect, the fuel tank and the joint are supported by the ladder frame, and accordingly the relative vibration of the joint with respect to the fuel tank is reduced, and fatigue degradation (fatigue degradation due to vibration) of the first fuel pipe is suppressed. Also, the fuel tank and the joint are disposed inside (below) the center tunnel, and excess space in the center tunnel is effectively utilized.

In the fuel cell electric vehicle according to the above aspect, the center tunnel may include a first tunnel, and a second tunnel that continues from a rear end of the first tunnel and of which a cross-sectional area is smaller than a cross-sectional area of the first tunnel. The joint may be disposed in the first tunnel. According to the fuel cell electric vehicle having the above configuration, excess space in the center tunnel can be effectively utilized.

In the fuel cell electric vehicle having the above configuration, the joint may be disposed between the fuel tank and a ceiling of the first tunnel. According to the fuel cell electric vehicle having the above configuration, excess space in the center tunnel can be utilized even more effectively.

The fuel cell electric vehicle according to the above aspect may further include a band that is configured to fix the fuel tank to the ladder frame. This joint may be supported by the band.

In the fuel cell electric vehicle having the above configuration, an elastic member may be interposed between the band and the fuel tank. In the fuel cell electric vehicle having the above configuration, the elastic member can accommodate change in diameter of the fuel tank.

In the fuel cell electric vehicle according to the above aspect, a pressure reducing valve may be provided partway along the second fuel pipe linking the joint and the fuel cell stack. The pressure reducing valve may also be supported by the ladder frame.

In the fuel cell electric vehicle having the above configuration, the second fuel pipe between the pressure reducing valve and the joint may be made of metal. According to the fuel cell electric vehicle according to the above aspect and configuration, fatigue degradation of the fuel pipe between the joint and the pressure reducing valve can be suppressed.

The fuel cell electric vehicle according to the above aspect may further include an additional fuel tank that is supported at a rear portion of the ladder frame, a receptacle to which a nozzle of an external fuel supply device is connectable, and an additional joint that is supported by the ladder frame. In this case, in the fuel cell electric vehicle, a third fuel pipe extending from the joint, a fourth fuel pipe extending from the additional fuel tank, and a fifth fuel pipe extending from the receptacle, are linked by the additional joint. According to the fuel cell electric vehicle of the above aspect, the layout of the fuel cell stack, the receptacle, and the multiple fuel pipes connecting the two fuel tanks is simplified. Due to the additional joint also being supported by the ladder frame, fatigue degradation due to vibration of the third fuel pipe and the fourth fuel pipe that are made of metal and through which high-pressure fuel gas flows can also be suppressed.

In the fuel cell electric vehicle having the above configuration, the third fuel pipe, the fourth fuel pipe, and the fifth fuel pipe may be made of metal. According to the fuel cell electric vehicle having the above configuration, the third fuel pipe, the fourth fuel pipe, and the fifth fuel pipe, through which the high-pressure fuel gas flows, are made of metal, so that the pressure resistance is good.

Details of the technology disclosed in the disclosure, and further improvements, will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
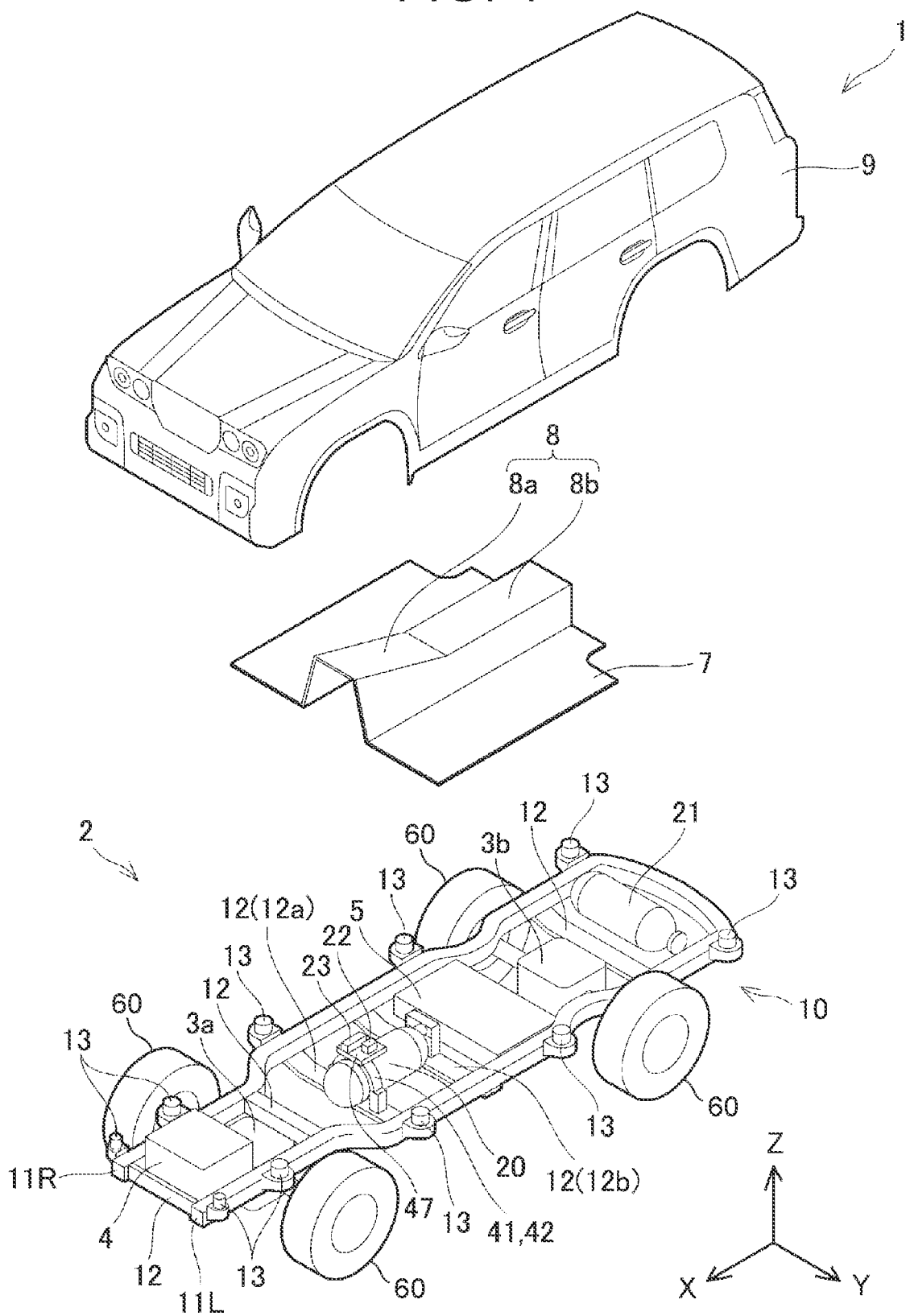
FIG. 1 is a perspective view of a fuel cell electric vehicle according to an embodiment serving as an example of the disclosure (a view in which a body and a floor panel are separated from a chassis)

A fuel cell electric vehicle 1 according to an embodiment of the disclosure will be described with reference to the drawings. FIG. 1 is a perspective view of the fuel cell electric vehicle 1. FIG. 1 is a perspective view in which a floor panel 7 and a body 9 are separated from a chassis 2. A +X direction, a +Y direction, and a +Z direction, of a coordinate system in the drawings respectively correspond to a forward side, a leftward side, and an upward side, of the vehicle. The directions indicated by the axes of the coordinate system are the same in all of the drawings.

The fuel cell electric vehicle 1 includes traction electric motors 3a and 3b, a fuel tank 20, an additional fuel tank 21, a fuel cell stack 4, and a battery 5. The fuel cell electric vehicle 1 also includes an inverter that converts direct current electric power of the power sources (fuel cell stack 4 and battery 5) into driving power of the electric motors 3a (3b), but the inverter is omitted from illustration. The electric motor 3a drives front wheels, and the electric motor 3b drives rear wheels. The fuel cell electric vehicle 1 is a four-wheel drive vehicle.

Hydrogen gas, which is an example of fuel gas, is stored in the fuel tank 20 and the additional fuel tank 21. The fuel cell stack 4 obtains electric power by causing reaction of hydrogen gas in the fuel tank 20 and the additional fuel tank 21 with oxygen in the air, which is well known. The direct current electric power of the fuel cell stack 4 and the battery 5 is converted into alternating current electric power by the inverter and is supplied to the traction electric motors 3a and 3b. The battery 5 stores excess output electric power of the fuel cell stack 4. The battery 5 also stores regenerative electric power (electric power generated by the electric motors 3a and 3b using inertial energy of the vehicle). The battery 5 also supplements insufficient output of the fuel cell stack 4 in some cases.

Figure 3:
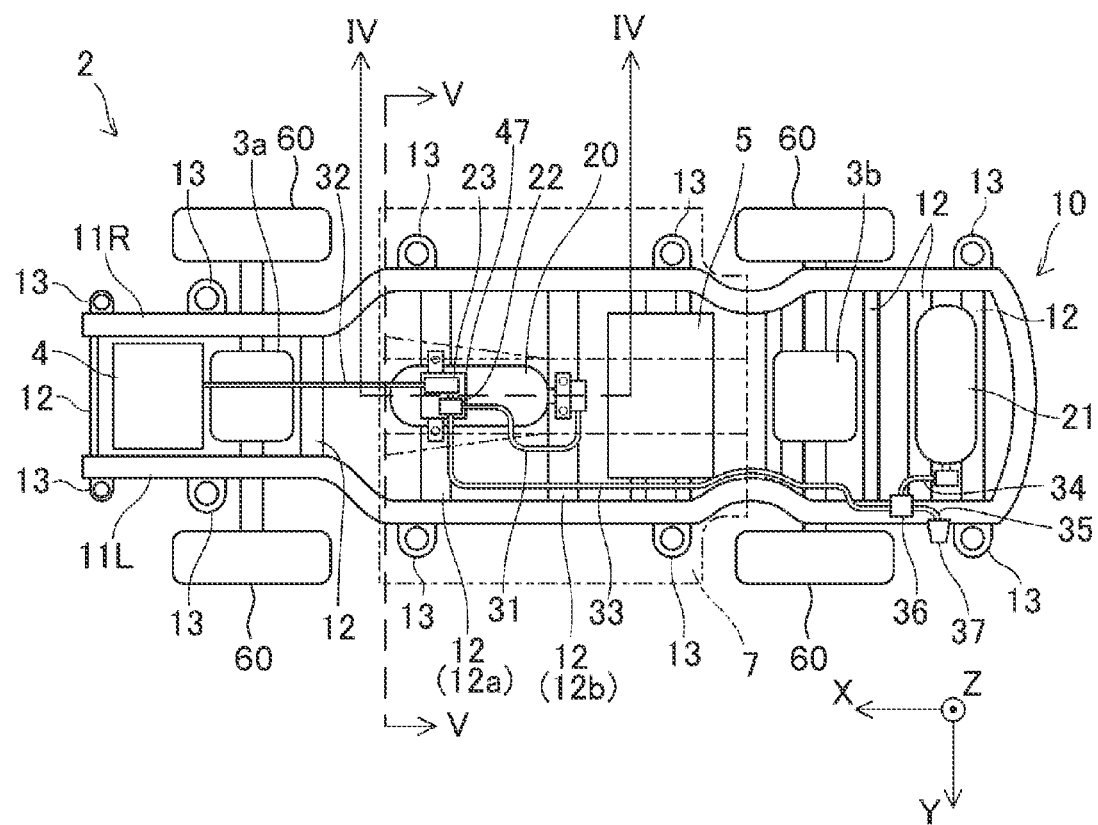
FIG. 3 is a plan view of the chassis illustrated in FIG. 1.
Figure 4:
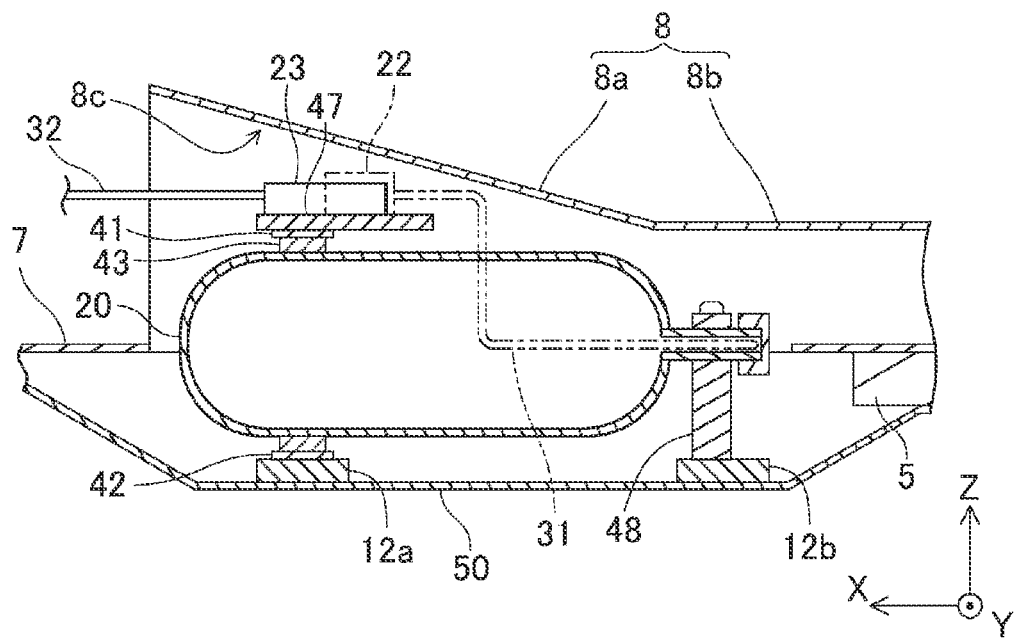
FIG. 4 is a sectional view of the chassis along line IV-IV in FIG. 3.
Figure 5:
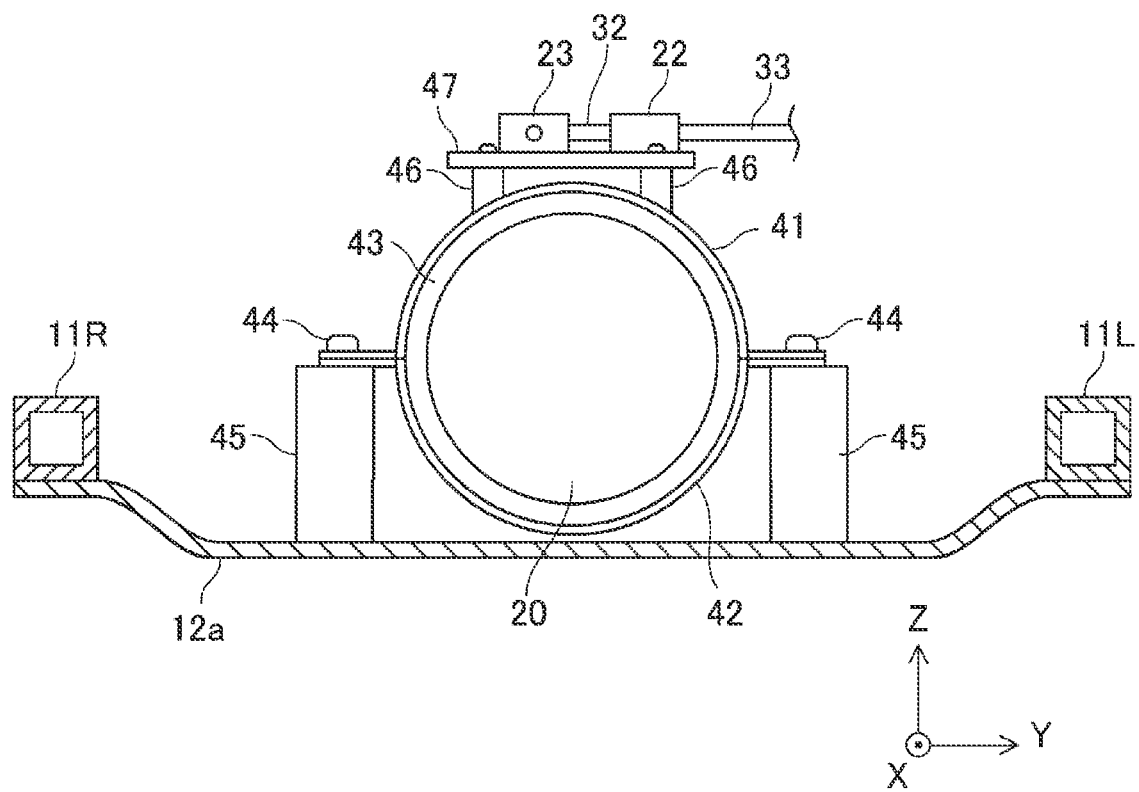
FIG. 5 is a cross-sectional view of the chassis along line V-V in FIG. 3.

The fuel cell electric vehicle 1 has a ladder type frame (ladder frame 10). The ladder frame 10 includes two side members 11R and 11L extending in a front-rear direction of the chassis 2, and a plurality of cross members 12 linking the side members 11R and 11L. Drive system devices (the electric motors 3a and 3b, the battery 5, the fuel cell stack 4, the fuel tank 20, the additional fuel tank 21, tires 60, and so forth), and the ladder frame 10 that supports these, are referred to as the chassis 2. Note that in FIG. 1, fuel pipes connecting the fuel cell stack 4, the fuel tank 20, and the additional fuel tank 21 are omitted from illustration. In FIGS. 3, 4, and 5 described below, the fuel pipes are illustrated.

Although the floor panel 7 is drawn separately from the body 9 in FIG. 1, the floor panel 7 is joined to the body 9. The floor panel 7 is a part of the body 9. The body 9, including the floor panel 7, is supported by a plurality of vibration isolating mounts 13 provided on the side members 11R and 11L of the ladder frame 10. The vibration isolating mounts 13 include vibration isolating rubber, and protect the body 9 from the vibration of the chassis 2. In other words, the vibration of the chassis 2 is attenuated by the vibration isolating mounts 13, and only a slight amount of vibration is propagated to the body 9. The chassis 2 (ladder frame 10) vibrates while traveling and the vibration isolating mounts 13 suppress the vibration of the body 9, and accordingly the chassis 2 (ladder frame 10) vibrates relative to the body 9 while traveling.

The fuel tank 20 is fixed to the ladder frame 10 by bands 41 and 42. A baseplate 47 is fixed to the band 41 that covers an upper side of the fuel tank 20, and a pressure reducing valve 23 and a first joint 22 are fixed to the baseplate 47. The pressure reducing valve 23 and the first joint 22 will be described later.

Figure 2:
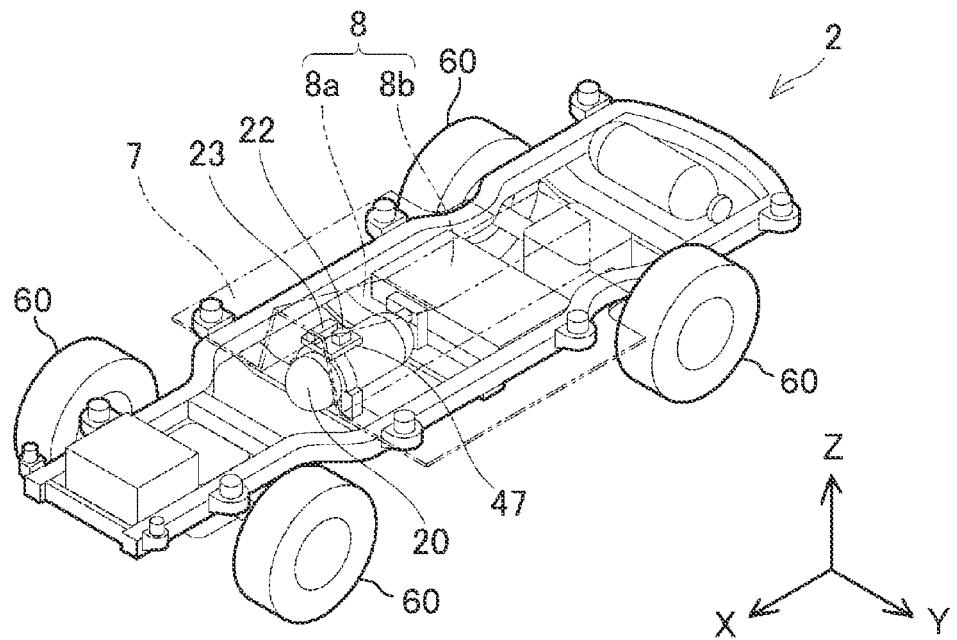
FIG. 2 is a perspective view illustrating a positional relation between a fuel tank and a center tunnel illustrated in FIG. 1.

FIG. 2 is a perspective view of the chassis 2 and the floor panel 7 disposed on the chassis 2. FIG. 3 is a plan view of the chassis 2. In FIGS. 2 and 3, the floor panel 7 is drawn in hidden outline. As described above, the floor panel 7 is fixed to the body 9, and the body 9 including the floor panel 7 is supported by the chassis 2 through the vibration isolating mounts 13. In FIGS. 2 and 3, the body 9 is omitted from illustration.

A center tunnel 8 is provided in the floor panel 7. The center tunnel 8 extends in the front-rear direction of the chassis 2, between a driver's seat and a passenger seat (omitted from illustration). The center tunnel 8 is divided into a first tunnel 8a and a second tunnel 8b, for the sake of convenience of description. The first tunnel 8a has a front end that is large, and gradually decreases in size toward the rear. A rear end of the first tunnel 8a is the smallest portion thereof. The second tunnel 8b continues from the rear end of the first tunnel 8a. The cross-sectional area of the second tunnel 8b is smaller than the cross-sectional area of the first tunnel 8a. As illustrated in FIG. 2, the fuel tank 20, the pressure reducing valve 23, and the first joint 22 are disposed in (below) the center tunnel 8.

As described above, the fuel cell stack 4, the electric motors 3a and 3b, the fuel tank 20, the additional fuel tank 21, and the battery 5 are supported by the ladder frame 10 (see FIG. 3). The fuel tank 20 is fixed to cross members 12a and 12b. The ladder frame 10 has the cross members 12, and the cross members 12a and 12b are cross members at the middle in the front-rear direction of the chassis 2. The fuel tank 20 is supported by (fixed to) the middle of the ladder frame 10 (the middle in the front-rear direction), and the additional fuel tank 21 is supported by (fixed to) a rear portion of the ladder frame 10.

FIG. 4 is a sectional view of the chassis taken along line IV-IV in FIG. 3. As described above, the fuel tank 20 is disposed in (below) the center tunnel 8 of the floor panel 7. At least an upper half of the fuel tank 20 is located within the center tunnel 8, and a lower half is located below the center tunnel 8.

In a conventional engine vehicle (a front-engine rear-drive vehicle), a transmission is disposed in the center tunnel. fuel cell electric vehicle s do not need transmissions. In the fuel cell electric vehicle 1, the fuel tank 20 is disposed in the center tunnel 8 instead of the transmission.

A protective plate 50 is disposed under the fuel tank 20. The protective plate 50 is omitted from illustration in FIGS. 1 to 3. The protective plate 50 protects the fuel tank 20 from pebbles and the like being kicked up from the road while traveling. The protective plate 50 is fixed to lower faces of the cross members 12a and 12b.

The fuel tank 20 is fixed to the cross member 12a by the bands 41 and 42, and is fixed to the cross member 12b by a support plate 48. The support plate 48 supports a neck portion of the fuel tank 20. An elastic member 43 is interposed between the bands 41 and 42, and the fuel tank 20. An example of the elastic member 43 will be described later.

The baseplate 47 is fixed to the band 41, and the pressure reducing valve 23 and the first joint 22 are fixed upon the baseplate 47. The pressure reducing valve 23 and the first joint 22 are supported by the ladder frame 10 through the band 41 and the baseplate 47. The pressure reducing valve 23 and the first joint 22 are disposed in the first tunnel 8a. In other words, the pressure reducing valve 23 and the first joint 22 are disposed between the fuel tank 20 and a ceiling 8c of the first tunnel 8a. As described above, the cross-sectional area of the first tunnel 8a gradually becomes smaller from forward to rearward. Space between the fuel tank 20 and the ceiling 8c is excess space, and the pressure reducing valve 23 and the first joint 22 are disposed in this excess space.

In FIG. 4, the first joint 22 and a first fuel pipe 31 located in front of the line IV-IV of FIG. 3 are drawn in hidden outlines. In FIG. 4, a third fuel pipe 33 is omitted from illustration. The first fuel pipe 31 is a fuel pipe that links the first joint 22 and the fuel tank 20. Note that the first joint 22 and the fuel cell stack 4 are linked by a second fuel pipe 32, and the pressure reducing valve 23 is provided partway along the second fuel pipe 32. The first joint 22 (and a second joint 36 described later) are fluid couplings that link fuel pipes for feeding high-pressure hydrogen gas. The first fuel pipe 31, the second fuel pipe 32, and other fuel pipes will be described later.

FIG. 5 is a cross-sectional view of the chassis along line V-V in FIG. 3. In FIG. 5, the center tunnel 8 which is provided in the floor panel 7, and the protective plate 50 (see FIG. 4) that protects the fuel tank 20 are omitted from illustration. The bands 41 and 42 surround the fuel tank 20, and are fixed to upright bars 45 provided on the cross member 12a by bolts 44. The elastic member 43 is interposed between the bands 41 and 42, and the fuel tank 20. The elastic member 43 protects the fuel tank 20 from vibrations of the chassis 2. Also, the fuel tank 20 expands when fully filled with hydrogen gas. As the amount of hydrogen gas is depleted, the diameter of the fuel tank 20 becomes smaller. The elastic member 43 is capable of accommodating the change in diameter of the fuel tank 20. In other words, the elastic member 43 deforms according to the change in the diameter of the fuel tank 20, and accordingly the positions of the bands 41 and 42 and the position of the center axis of the fuel tank 20 do not change even when the diameter of the fuel tank 20 changes.

Upright bars 46 are provided on the band 41 covering the upper half of the fuel tank 20, and the baseplate 47 is fixed to the upright bars 46. As described above, the pressure reducing valve 23 and the first joint 22 are fixed to the baseplate 47. The pressure reducing valve 23 is provided partway along the second fuel pipe 32 linking the first joint 22 and the fuel cell stack 4 (see FIG. 3), as described above. The first joint 22 and the fuel tank 20 are linked by the first fuel pipe 31 (omitted from illustration in FIG. 5). The third fuel pipe 33 for feeding hydrogen gas from the additional fuel tank 21 (see FIG. 3) is also linked to the first joint 22.

The layout of fuel pipes 31 to 35 will be described with reference to FIG. 3. As described above, the fuel tank 20 and the first joint 22 are linked by the first fuel pipe 31, and the first joint 22 and the fuel cell stack 4 are linked by the second fuel pipe 32. The pressure reducing valve 23 is provided partway along the second fuel pipe 32. High-pressure hydrogen gas in the fuel tank 20 flows from the fuel tank 20 to the pressure reducing valve 23 without being depressurized. The pressure of the hydrogen gas is reduced by the pressure reducing valve 23. The pressure of the hydrogen gas flowing from the pressure reducing valve 23 to the fuel cell stack 4 is lower than the pressure of the hydrogen gas flowing from the fuel tank 20 to the pressure reducing valve 23. The first fuel pipe 31 is made of metal, so as to be capable of withstanding the high pressure of the hydrogen gas. The portion of the second fuel pipe 32 between the first joint 22 and the pressure reducing valve 23 is also made of metal. The rest of the second fuel pipe 32 may be made of metal, or may be made of a flexible material (e.g., rubber). Note that the fuel cell stack 4 is supported by a front portion of the ladder frame 10.

The rear portion of the ladder frame 10 supports the additional fuel tank 21. The second joint 36 is also supported by the ladder frame 10. The first joint 22 and the second joint 36 are linked by the third fuel pipe 33. A fourth fuel pipe 34 extending from the additional fuel tank 21, and a fifth fuel pipe 35 extending from a receptacle 37, are also linked to the second joint 36. The second joint 36 links the third fuel pipe 33, the fourth fuel pipe 34, and the fifth fuel pipe 35. The receptacle 37 is an inlet for connecting a nozzle of an external fuel supply device. The receptacle 37 is also supported by the ladder frame 10.

The hydrogen gas that is externally supplied through the receptacle 37 is fed to the second joint 36 through the fifth fuel pipe 35. The hydrogen gas is branched into the third fuel pipe 33 and the fourth fuel pipe 34 at the second joint 36. The hydrogen gas flowing through the fourth fuel pipe 34 is supplied to the additional fuel tank 21. The hydrogen gas flowing through the third fuel pipe 33 is supplied to the fuel tank 20 through the first joint 22 and the first fuel pipe 31.

When operating the fuel cell stack 4, the hydrogen gas in the fuel tank 20 is fed to the fuel cell stack 4 through the first fuel pipe 31 and the second fuel pipe 32, and the hydrogen gas in the additional fuel tank 21 is fed to the fuel cell stack 4 through the fourth fuel pipe 34, the second joint 36, the third fuel pipe 33, the first joint 22, and the second fuel pipe 32. The fuel pipes 31 and 33 to 35 are made of a metal having a high level of pressure withstanding performance, since high-pressure hydrogen gas flows therethrough. The hydrogen gas in the fuel tank 20 and the additional fuel tank 21 is depressurized when passing through the pressure reducing valve 23, and thereafter is supplied to the fuel cell stack 4.

As illustrated in FIG. 3, in the fuel cell electric vehicle 1 according to the present embodiment, the layout of the fuel cell stack 4, the receptacle 37, and the multiple fuel pipes 31 to 35 connecting the two fuel tanks, i.e., the fuel tank 20 and the additional fuel tank 21, is simple.

Figure 6:
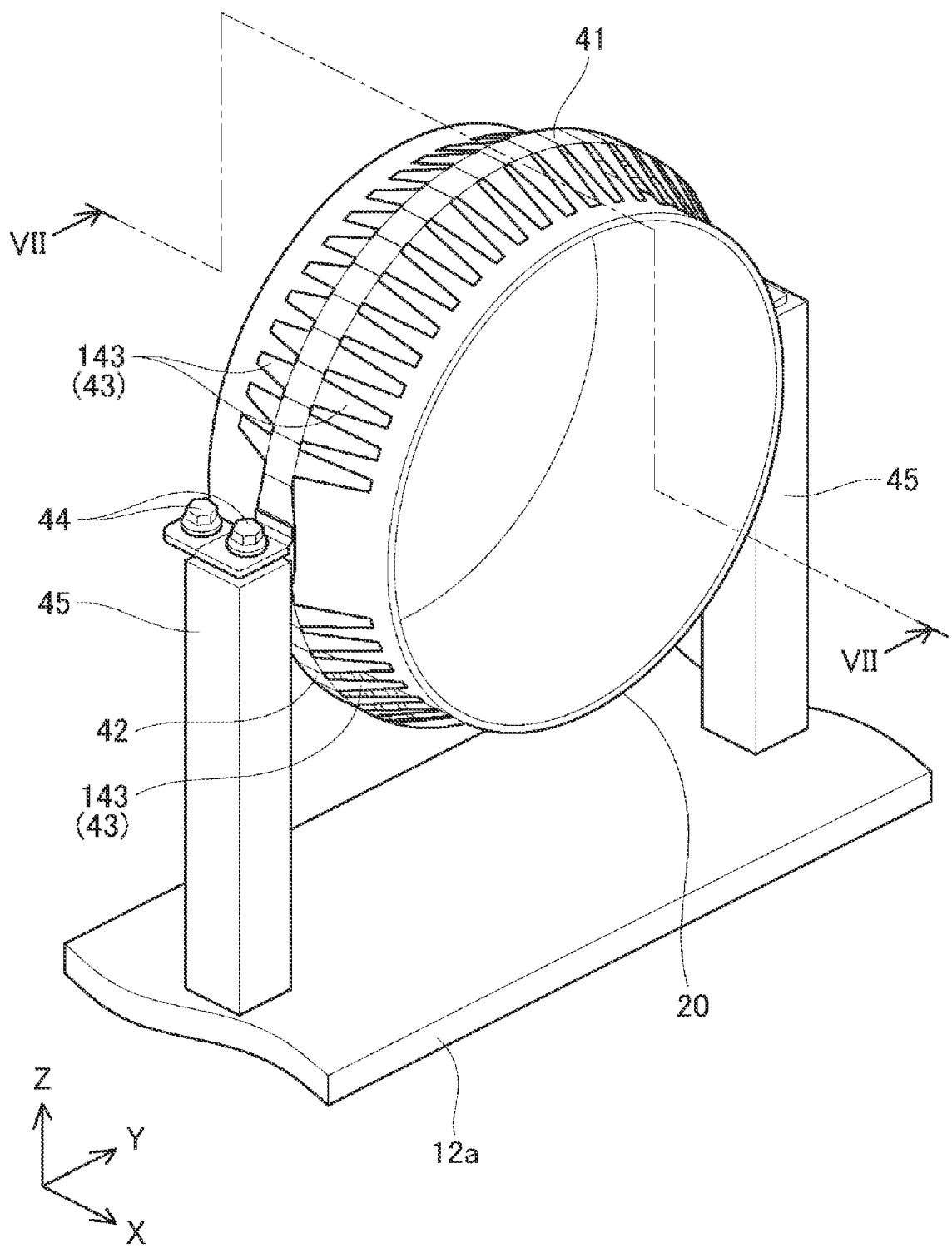
FIG. 6 is a partial perspective view in a vicinity of bands that fix the fuel tank illustrated FIG. 1.
Figure 7:
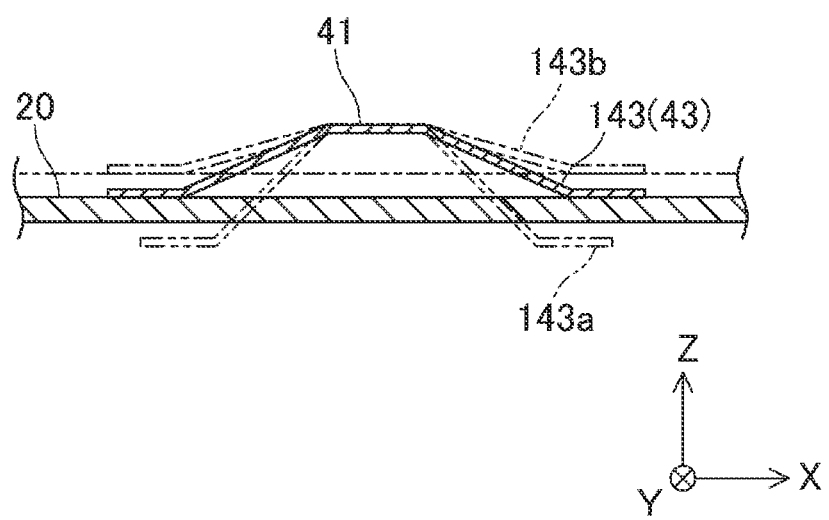
FIG. 7 is a sectional view taken along line VII-VII in FIG. 6.

A specific example of the elastic member 43 interposed between the fuel tank 20 and the bands 41 and 42 will be described with reference to FIGS. 6 and 7. One specific example of the elastic member 43 is a plurality of leaf springs 143. FIG. 6 is a partial perspective view in the vicinity of the bands 41 and 42 fixing the tank 20. FIG. 7 is a sectional view taken along line VII-VII in FIG. 6.

As described above, the upright bars 45 extend upward from the cross member 12a, and the bands 41 and 42 for fixing the tank 20 are fixed to the upright bars 45 by bolts 44. The leaf springs 143 extend from both side ends of the bands 41 and 42. The leaf springs 143 are integrally formed with the band 41 (42). That is to say, the leaf springs 143 and the band 41 (42) are made of one sheet of steel.

The leaf springs 143 are disposed surrounding the fuel tank 20. Tip ends of each of the leaf springs 143 extend so as to near the center axis of the fuel tank 20. Hidden outlines 143a in FIG. 7 illustrate the shape of the leaf springs when the fuel tank 20 is not present. Each of the leaf springs 143 applies a load to the fuel tank 20 in the center axis direction, with the tip ends thereof in contact with the fuel tank 20. The leaf springs 143 surrounding the fuel tank 20 place a uniform load on the fuel tank 20 from the periphery thereof toward the center axis. When the amount of hydrogen gas stored in the fuel tank 20 changes, the internal pressure of the fuel tank 20 changes, and the diameter of the fuel tank 20 changes. Hidden outlines 143b in FIG. 7 illustrate the shape of the leaf springs when the fuel tank 20 is expanded. The leaf springs 143 uniformly place a load on the fuel tank 20 from the periphery thereof, and accordingly the position of the center axis does not change even if the diameter of the fuel tank 20 changes.

Note that the leaf springs 143 are an example of the elastic member 43, and the elastic member 43 is not limited to the leaf springs 143. The elastic member 43 may be a flame-resistant rubber sheet or the like that expands and contracts in a thickness direction.

Features of the fuel cell electric vehicle 1 according to the present embodiment will be described. As described above, the body 9 is supported by the ladder frame 10 through the vibration isolating mounts 13. When traveling, the ladder frame 10 vibrates relative to the body 9. The fuel cell stack 4 and the fuel tank 20 are supported by the ladder frame 10, and accordingly in an arrangement in which the first joint 22 is supported by the body 9, the fuel tank 20 and the first joint 22 would vibrate relative to each other when traveling. The two are linked by a metal pipe (first fuel pipe 31). Vibration of the fuel tank 20 and the first joint 22 relative to each other would repeatedly deform the first fuel pipe 31 that is made of metal and that connects the two. Repeated deformation of the first fuel pipe 31 made of metal accelerates metal fatigue. In the fuel cell electric vehicle 1, the fuel cell stack 4, the fuel tank 20, and the first joint 22 are supported by the ladder frame 10. Accordingly, the relative positions of the fuel tank 20 and the first joint 22 do not change even while traveling. Hence, the first fuel pipe 31 connecting the fuel tank 20 and the first joint 22 is not deformed. Both the fuel tank 20 and the first joint 22 are supported by the ladder frame 10, and accordingly fatigue degradation (fatigue degradation due to repeated deformation) of the first fuel pipe 31 made of metal is suppressed.

In the fuel cell electric vehicle 1 according to the present embodiment, the additional fuel tank 21 is also supported by the ladder frame 10. The fuel pipes 33 and 34 connecting the fuel tank 20 and the additional fuel tank 21 are also made of metal, since high-pressure hydrogen gas that is not depressurized flows therethrough. The second joint 36 linking the third fuel pipe 33 and the fourth fuel pipe 34 is also supported by the ladder frame 10. Accordingly, the third fuel pipe 33 and the fourth fuel pipe 34 are not deformed while traveling, and degradation and fatigue of these fuel pipes that are made of metal can be suppressed.

In the fuel cell electric vehicle 1, all devices related to the fuel cell (the fuel cell stack 4, the fuel tank 20, the additional fuel tank 21, the fuel pipes 31 to 35 linking therebetween, the first joint 22, the second joint 36, and the pressure reducing valve 23) are supported by the ladder frame 10. The fuel pipe does not bridge the ladder frame 10 and the body 9, and accordingly safety is improved.

Also, due to all of the devices related to the fuel cell being supported by the ladder frame 10, checking for hydrogen gas leaks can be performed before attaching the body 9 to the chassis 2. When a hydrogen gas leak is found before the body 9 is attached, parts can be easily replaced.

Points to be noted regarding the technology described in the embodiment will be described. The additional fuel tank 21 is an example of an additional fuel tank. The first joint 22 is an example of a joint. The second joint 36 is an example of an additional joint. The first joint 22 and the second joint 36 are fluid distribution couplings to which three or more fuel pipes are linked, and may also be referred to as manifolds.

The fuel cell electric vehicle according to the present embodiment includes two fuel tanks, which are the fuel tank 20 and the additional fuel tank 21. The fuel cell electric vehicle disclosed in the present specification may be provided with even more fuel tanks.

While a specific examples of the present disclosure have been described in detail above, these are merely exemplary, and do not limit the scope of the claims. The technology set forth in the claims includes various modifications and variations of the specific examples exemplified above. The technical elements described in the present specification or drawings exhibit technical utility alone or in various combinations, and are not limited to the combinations described in the claims at the time of application. The technology exemplified in the present specification or the drawings can achieve a plurality of objects at the same time, and achieving one of the objects itself has technical utility.

What is claimed is:

1. A fuel cell electric vehicle, comprising:
    a ladder frame including two side members extending in parallel in a front-rear direction of the fuel cell electric vehicle and a plurality of cross members linking the two side members;
    a fuel cell stack that is supported by the ladder frame;
    a fuel tank that is configured to store fuel gas to be used by the fuel cell stack;
    a joint that is configured to link a pipe for carrying the fuel gas that is under high pressure in the fuel tank;
    a first fuel pipe that is made of metal and that is configured to link the fuel tank and the joint;
    a second fuel pipe that is configured to link the joint and the fuel cell stack; and
    a center tunnel provided in a floor panel,
    wherein the fuel tank and the joint are supported by the ladder frame and are disposed in the center tunnel, wherein the center tunnel includes a first tunnel, and a second tunnel that continues from a rear end of the first tunnel and of which a cross-sectional area is smaller than a cross-sectional area of the first tunnel, and wherein the joint is disposed in the first tunnel between the fuel tank and a ceiling of the first tunnel.

2. The fuel cell electric vehicle according to claim 1, further comprising a band that is configured to fix the fuel tank to the ladder frame, wherein the joint is supported by the band.

3. The fuel cell electric vehicle according to claim 2, further comprising an elastic member that is interposed between the band and the fuel tank.

4. The fuel cell electric vehicle according to claim 1, wherein:

the second fuel pipe is provided with a pressure reducing valve; and the pressure reducing valve is supported by the ladder frame.

5. The fuel cell electric vehicle according to claim 4, wherein the second fuel pipe between the pressure reducing valve and the joint is made of metal.

6. The fuel cell electric vehicle according to claim 1, further comprising:

an additional fuel tank that is supported at a rear portion of the ladder frame;

a receptacle to which a nozzle of an external fuel supply device is connectable; and an additional joint that is supported by the ladder frame, wherein a third fuel pipe, a fourth fuel pipe, and a fifth fuel pipe are linked to the additional joint, the third fuel pipe extending from the joint, the fourth fuel pipe extending from the additional fuel tank, and the fifth fuel pipe extending from the receptacle.

7. The fuel cell electric vehicle according to claim 6, wherein the third fuel pipe, the fourth fuel pipe, and the fifth fuel pipe are made of metal.

* * * * *